United States Patent [19]

Sprinkle

[11] Patent Number: 5,095,996
[45] Date of Patent: Mar. 17, 1992

[54] ROTARY TILLER ATTACHMENTS FOR FACILITATING TURNING

[76] Inventor: Elbert P. Sprinkle, Rte. 1, Box 320, Walton, Ind. 46994-9603

[21] Appl. No.: 619,865

[22] Filed: Nov. 29, 1990

[51] Int. Cl.$^5$ ............................................ A01B 69/00
[52] U.S. Cl. .................................... 172/42; 172/354; 172/776; 280/47.12
[58] Field of Search ................... 172/42, 43, 256, 329, 172/351, 354, 355; 280/47.12, 47.31, 11.2

[56] References Cited

U.S. PATENT DOCUMENTS

| | | | |
|---|---|---|---|
| 280,824 | 10/1985 | Mikado | D15/12 |
| 1,355,472 | 10/1920 | Harding | 172/256 |
| 1,462,155 | 7/1923 | Tilstra | 172/256 X |
| 1,950,023 | 3/1934 | Allen | 172/256 X |
| 2,457,821 | 1/1949 | Johnson | 172/256 X |
| 2,551,122 | 5/1951 | Hayner | 280/11.2 |
| 2,989,127 | 6/1961 | Oertle, Jr. | 172/42 |
| 3,016,957 | 1/1962 | Olson | 172/42 |
| 3,248,128 | 4/1966 | Grable et al. | 280/47.31 |
| 3,540,632 | 11/1970 | Clingan | 222/178 |
| 4,189,008 | 2/1980 | Porter | 172/256 X |
| 4,191,259 | 3/1980 | Boren | 172/43 |
| 4,640,366 | 2/1987 | Saito | 172/42 |

FOREIGN PATENT DOCUMENTS 2625471  7/1989  France ............................. 280/47.31

OTHER PUBLICATIONS

Snapper Power Equipment, "Snapper-The Tillers That Come With a Well Grounded Reputation", 8 pages, printed in the USA.
BCS, "BCS-The New Pride in an Old Tradition", 15 pages, date and place of publication unknown.
BCS Sales Brochure, BCS Mosa Inc., received in PTO 12/23/86.
The 1985 Troy-Built, Roto Tiller-Power Composters Catalog, p. 21.

*Primary Examiner*—Randolph A. Reese
*Assistant Examiner*—Jeffrey L. Thompson
*Attorney, Agent, or Firm*—Woodard, Emhardt, Naughton, Moriarty & McNett

[57] ABSTRACT

A conventional rotary tiller having an engine, an axle with two wheels, a set of tines, handlebars, and an attachment that facilitates turning. The attachment comprises a turntable which is mounted to the tiller opposite the tines in such a way that it remains out of contact with the ground during normal cultivation operations. Turning the tiller is accomplished by pivoting the tiller about the axle onto the turntable, and then rotating the tiller on the turntable to a new direction. The tiller is then pivoted back to resume normal operations in the new direction.

11 Claims, 4 Drawing Sheets

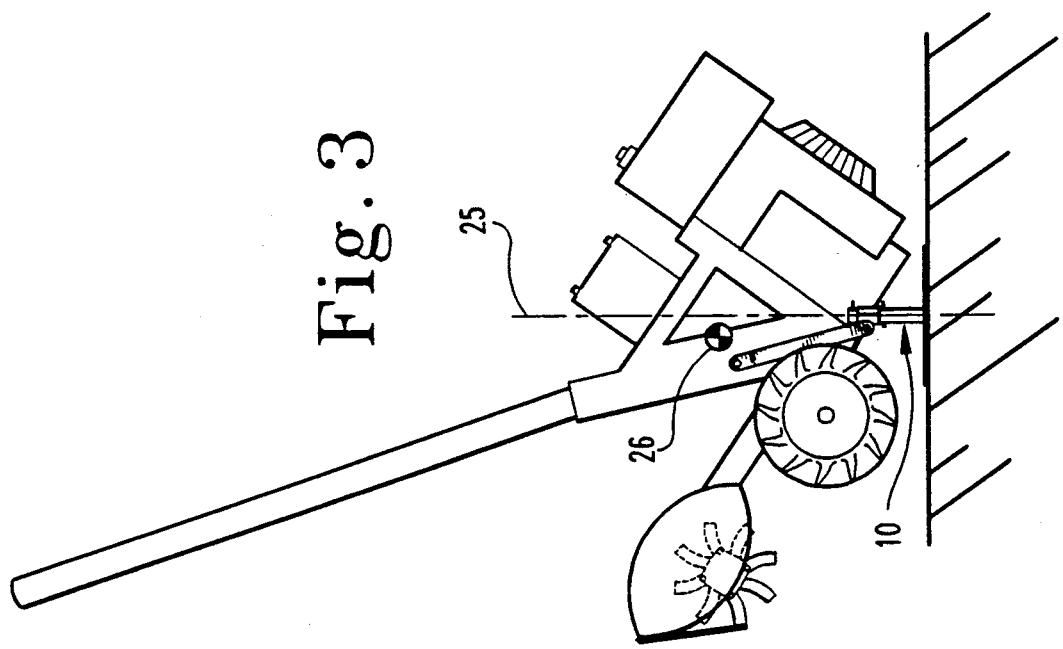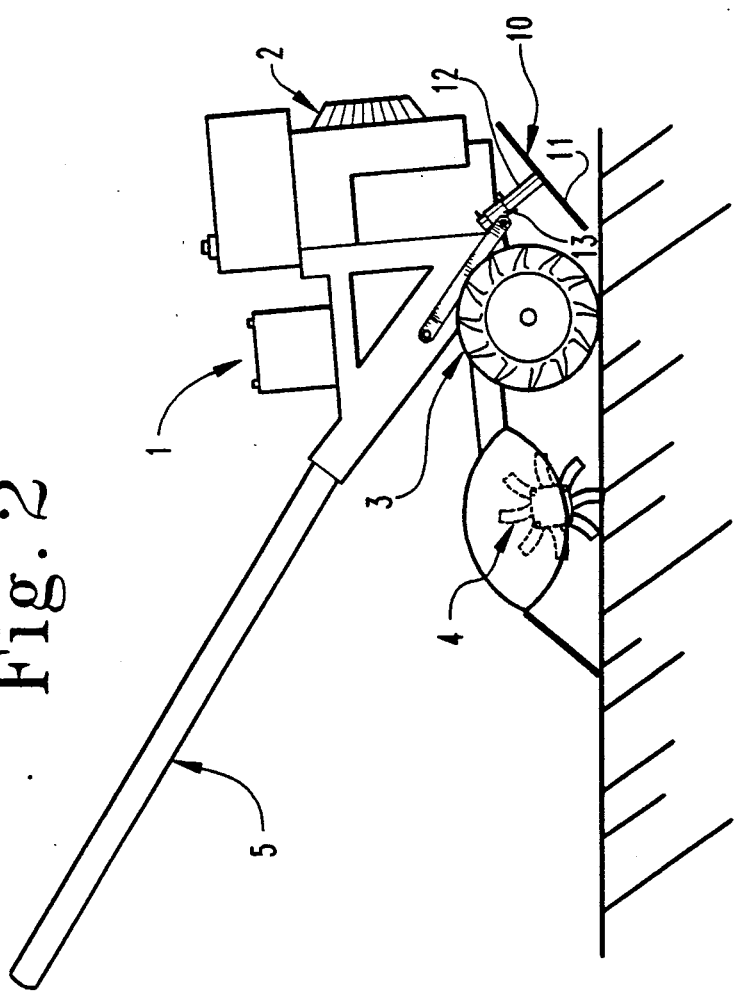

5,095,996

ROTARY TILLER ATTACHMENTS FOR FACILITATING TURNING

BACKGROUND OF THE INVENTION

This invention relates generally to accessories and attachments for rotary tillers, and more specifically to an attachment which facilitates turning of the rotary tiller.

Cultivation of gardens and the like using a rotary tiller is predominantly a matter of rectilinear movement, and for this reason, rotary tillers are primarily designed to operate in a straight line. Consequently, rotary tillers tend to be unwieldy and somewhat resistant to making sharp turns, such as at the end of a row. Turns are especially difficult when space is limited.

Rotary tillers normally consist of four principal components: 1) an engine, 2) a single axle having two wheels, 3) a set of tines, and 4) handlebars. The weight of the device is ordinarily distributed nearly evenly on each side of the axle, with the engine usually countering the weight of the tines. Most rotary tillers position the engine in front of the axle and the tines behind. The balance of the weight about the axle and the long lever arm provided by the handlebars renders the device manageable and controllable to most adult operators.

The normal mode for safely turning a rotary tiller is with the engine idling and the tines disengaged. The operator then, by lifting up on the handlebars, pivots the weight of the device about the axle in order to raise the tines above the ground. However, to prevent potential damage to the engine, the tiller must not be pivoted so far that the engine comes in contact with the ground. In other words, the operator must balance the weight of the tiller over the axle so that only the wheels are in contact with the ground. The operator then pushes and turns the tiller until orienting the tiller in the new direction, while at the same time maintaining the weight balance.

Maintaining this balance without moving the tiller is difficult enough, but maintaining this balance while attempting to turn the tiller in another direction is quite awkward and requires considerably more strength and dexterity than any of the other normal functions of a rotary tiller. The difficulty in turning the tiller is also proportional to the radial tightness of the turn.

What is needed is a relatively simple and inexpensive attachment for rotary tillers that enables the operator to quickly and easily turn the tiller. It would also be desirable to have an attachment that enables a rotary tiller to be turned easily when limited space is available. Finally, it is desirable that such an attachment be suitable for attachment on most commercial rotary tillers.

SUMMARY OF THE INVENTION

A rotary tiller attachment that facilitates turning according to one embodiment of the present invention comprises a turntable and a means for attachment to a conventional rotary tiller. A conventional rotary tiller is one having an engine, an axle with two wheels, a set of tines, and handlebars. The turntable defines an axis of rotation and has sufficient strength to support the weight of the rotary tiller. The turntable is attached to the rotary tiller so that the center of gravity of the rotary tiller can be readily aligned with this axis of rotation. In this way, the tiller will remain balanced when supported by the turntable. The turntable remains disengaged from the ground during normal cultivation operations but is capable of engaging the ground and facilitating a directional turn of the rotary tiller when the tiller is pivoted about its axle onto the turntable.

A rotary tiller attachment that facilitates turning according to another embodiment of the present invention comprises a convex shaped platform having a smooth outer surface and a means for attachment to a conventional rotary tiller. The platform is attached so that it remains disengaged from the ground while the tiller is in normal operation. In order to change direction, the rotary tiller is pivoted about its axle until the platform has engaged the ground. The tiller is then rotated to a new direction while supported by the platform. The tiller is then pivoted back about its axle to resume normal cultivation operations in the new direction.

A rotary tiller attachment that facilitates turning according to still another embodiment of the present invention comprises a caster and a means for attachment to a conventional rotary tiller. The caster is attached so that it remains disengaged from the ground while the tiller is in normal operation. In order to change direction, the rotary tiller is pivoted about its axle until the caster contacts the ground. The tiller is then turned to a new direction while being supported by the caster and the tiller's two wheels. The tiller is then pivoted back about its axle to resume normal cultivation operations in the new direction.

One object of the present invention is to provide an improved rotary tiller attachment which facilitates turning.

Related objects and advantages of the present invention will be apparent from the following description.

BRIEF DESCRIPTION OF THE DRAWINGS

FIG. 2 is a side view of a conventional rotary tiller having the attachment of the preferred embodiment of the present invention connected thereto.

FIG. 3 is a side view of the rotary tiller of FIG. 2 while supported by the attachment that facilitates turning according to the preferred embodiment of the present invention.

DESCRIPTION OF THE PREFERRED EMBODIMENTS

Figure 1:
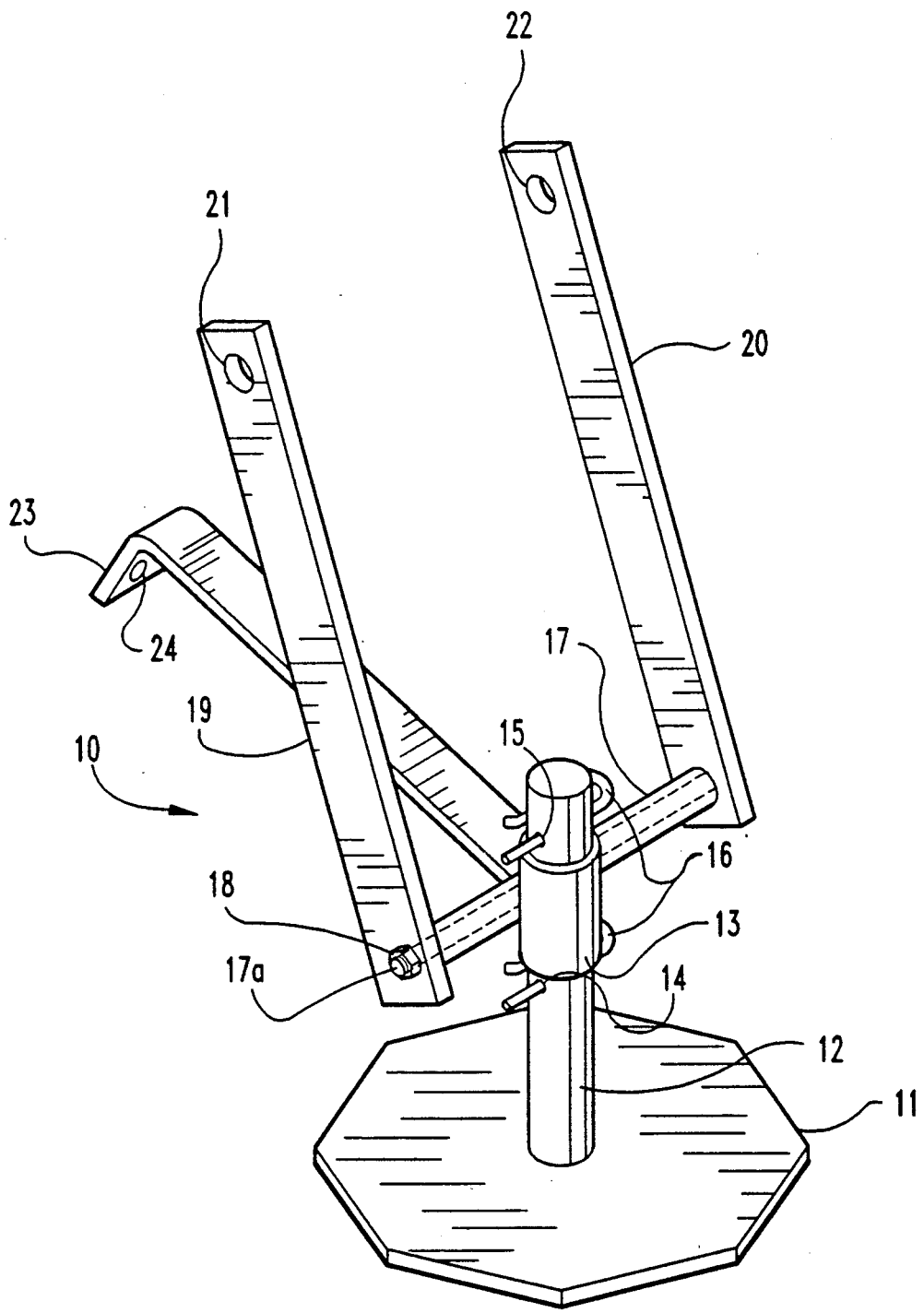
FIG. 1 is an isometric view of a rotary tiller attachment that facilitates turning according to the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated in FIG. 1 a rotary tiller attachment 10 for facilitating turning of the tiller, and which constitutes a preferred embodiment of the present invention. The attachment 10 includes an octagonally shaped turntable 11 having a shaft 12 attached thereto.

Shaft 12 is received by collar 13 and is restrained from longitudinal movement by cotter pins 16 inserted through holes 14 and 15 in shaft 12, above and below collar 13. Shaft 12 is preferably made from steel rod and has a diameter that permits it to freely rotate within collar 13.

Welded or otherwise connected to collar 13 is a tube 17, through which extends a rod 17a that is threaded at both ends. Nut 18 is threaded onto the threaded end of rod 17a and holds strut 19 against the end of tube 17. Strut 20 is secured in the same manner as strut 19. When nuts 18 are loosened, struts 19 and 20 can pivot about the axis defined by tube 17. This enables struts 19 and 20 to be secured at any angle in order to better facilitate connection of the attachment 10 to a variety of rotary tillers. The struts are bolted to a rotary tiller at holes 21 and 22 at the ends of struts 19 and 20 respectively. A support member 23 is welded or otherwise connected to collar 13, although it may be connected to tube 17. The member 23 can be bolted to a rotary tiller at hole 24 in the free end of the member.

Referring now to FIG. 2, there is shown a conventional rotary tiller 1 which includes an attachment 10 that facilitates turning of the tiller. For simplicity, this conventional rotary tiller is depicted as having an engine 2, an axle and two wheels 3, a set of tines 4, and handlebars 5. The attachment 10 is connected to the rotary tiller on the side of axle 3 that is opposite tines 4. Attachment 10 is also connected in a such a way that it remains clear of the ground during normal cultivation operations. During cultivation operations, rotary tiller 1 is pivoted about axle 3 so that the tines dig into the soil. It should be noted that rotary tiller 1 is shown in idle mode in which the tines are touching the ground but are not tilling the soil.

FIG. 3 shows rotary tiller 1 from FIG. 2 after the tiller has been pivoted about the axle and wheels 3 until turntable 11 contacts the ground. In order to orient the rotary tiller in a new direction, the tiller is simply rotated about axis 25, which is defined by shaft 12 of the turntable (see FIG. 1). The shaft 12 rotates within collar 13 which is essentially fixed to the tiller by struts 19 and 20 and support member 23. After being rotated, the rotary tiller is pivoted about the edge of turntable 12 back onto its wheels and is ready to begin normal operations in the new direction. It should also be noted that, if the attachment 10 is mounted so that the axis 25 is generally aligned with the rotary tiller's center of gravity 26, the tiller will remain balanced upon attachment 10. With the center of gravity 26 close to the axis 25, the large mass of the tiller is more easily maneuvered. This also allows the rotary tiller to be stored in a smaller area and keeps the various parts of the tiller from touching the ground when not in use.

Turntable 11 is preferably cut from ¼" steel plate to ensure adequate strength. Although turntable 11 is shown in an octagonal shape, other shapes such as a square, circle or hexagon could perform adequately in certain applications. However, the octagonal shape has been found to provide optimum clearance between the turntable and the ground when the tiller is in use, and between the turntable and the tiller during turning. Moreover, the octagonal shape optimizes the area of contact for the turntable while maintaining clearance. A sufficiently large area of contact is required to distribute the tiller's weight over a larger ground area so that the turntable and tiller do not sink into the soil. In one specific embodiment, the turntable has a diameter of nine inches and an area of approximately 70 square inches.

Figure 4:
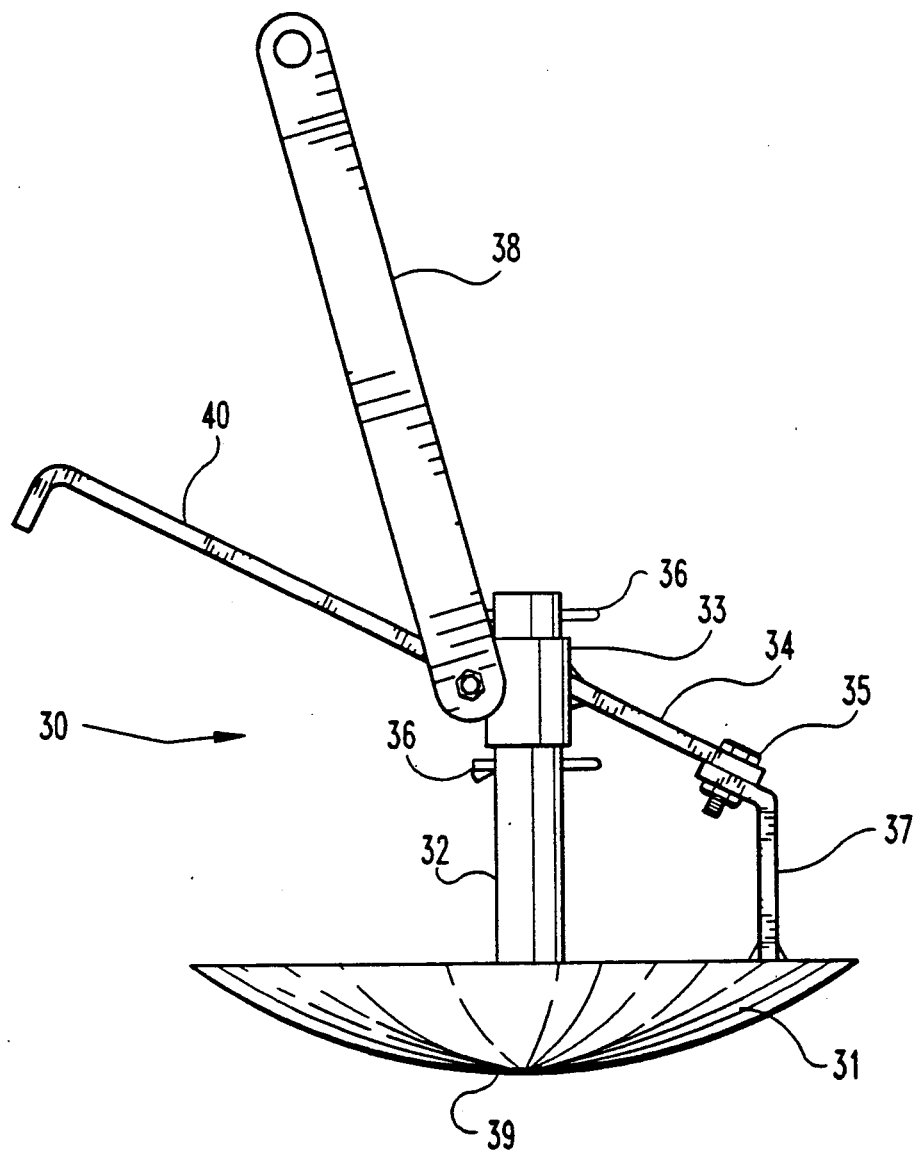
FIG. 4 is a side elevational view of a rotary tiller attachment that facilitates turning according to another embodiment of the present invention.

Another embodiment of the present invention is shown in FIG. 4. A convex skid plate 31 having a smooth outer surface 39 is connected to a shaft 32. Shaft 32 is received by collar 33 and is restrained from longitudinal motion by the use of cotter pins 36, in the same way that shaft 12 was kept in place by cotter pins 16 in the previous embodiment. Strut 38 and its counterpart (hidden from view in FIG. 4) are identical to struts 19 and 20 described earlier and are connected to collar 33 in the same way that struts 19 and 20 are connected to collar 13. Support member 40 is likewise identical to support member 23. This embodiment is also attached to a rotary tiller at three different bolt locations as described earlier. This embodiment does, however, differ from the preferred embodiment because skid plate 31 is prevented from rotating. This is accomplished by a brace 37 which is affixed to skid plate 31 at one end and bolted to an arm 34 with bolt 35 at its other end.

When using this embodiment as an attachment to a rotary tiller to facilitate a turn, the skid plate 31 remains rigid and rotates with the tiller. As described earlier, the tiller is pivoted about its axle until its weight is supported by the attachment 30. As the tiller is rotated or turned to a new direction, the smooth outer surface 39 of plate 31 skids or slides against the ground. After the turn is complete, the rotary tiller is pivoted back to its normal operating position (see FIG. 2) to resume cultivating in the new direction. It has been found that a skid plate having a diameter on the order of eleven inches and a radius of convexity on the order of ten inches provides adequate clearance and superior ease in turning the tiller.

Figure 5:
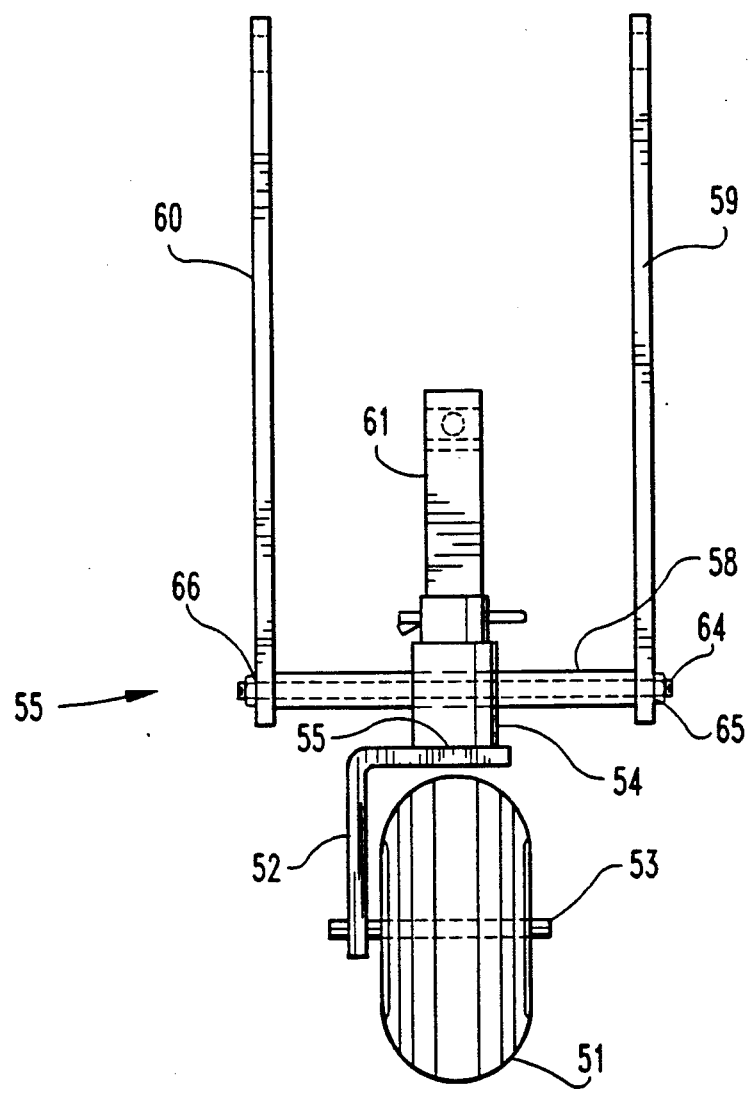
FIG. 5 is a front elevational view of a rotary tiller attachment that facilitates turning according to still another embodiment of the present invention.

Still another embodiment of the present invention is shown in FIG. 5. A wheel 51 is connected to bracket 52 by axle 53. Bracket 52 is connected to a short shaft 57. Short shaft 57 extends through a collar 54 and is kept in place by cotter pin 56 engaged to the short shaft above the collar. Only one cotter pin is required in this embodiment because surface 55 of bracket 52 abuts the lower rim of collar 54. Welded or otherwise connected to collar 54 is tube 58, within which extends a rod 64 that is threaded on both ends. Tube 58 is analogous to tube 17 described earlier. Struts 59 and 60, which are also analogous to struts 19 and 20, are likewise secured to rod 64 and against tube 58 by nuts 65 and 66, respectively. Support member 61 is also identical to support members 23 and 40 described earlier. Finally, this embodiment is mated to a rotary tiller in the same manner as described for the previous two embodiments.

Unlike the embodiments previously described, the two wheels of the rotary tiller (see FIGS. 2 and 3) remain in contact with the ground during the turn. In this case, the attachment 50 is mated to the rotary tiller in such a way that the tines of the tiller are clear of the ground when wheel 51 is touching the ground, and vice versa. The direction of the tiller is changed by first pivoting the tiller about its axle until the wheel 51 contacts the ground. Then, one side of the tiller is lifted until only one tiller wheel and the attachment wheel 51 contact the ground. The tiller is then turned to assume its new orientation. The tiller is then pivoted back and is ready to resume normal cultivation operations in the new direction. It is important that attachment wheel 51 be of sufficient width to prevent it from sinking into the soil when the partial weight of the tiller placed upon it during the turning sequence just described. A wheel attachment 51 having a diameter of five inches and a width of two and a half inches was found to perform best.

It is understood that the same tiller turning technique can be applied with the convex skid plate 31 of FIG. 4. In this instance, the turn can be similarly affected with the convex plane 31 and one tiller wheel in contact with the ground. The outer surface 39 of the plate 31 then skids along the ground during the turn while supporting the tiller.

Most manufacturers of rotary tillers offer a number of accessories and attachments which can be purchased to expand the capabilities of the rotary tiller or add new features. Accordingly, most rotary tillers come with numerous unused bolt holes to accommodate the various accessories and attachments that are currently available. It can be acknowledged that accessories for one brand of rotary tiller are generally not interchangeable with other brands, and often not even for different models from the same brand. Accordingly, different support structures from those shown and described herein would be necessary to enable the present invention to be utilized on all currently available brands and models of rotary tillers. The mating and support structures shown in FIGS. 1-5 may only be suitable for attachment to a limited number of rotary tillers. It should, therefore, be clear that any brackets and/or support structures which accomplish the same task of enabling the attachment to be connected to a rotary tiller are within the scope of the present invention.

While the invention has been illustrated and described in detail in the drawings and foregoing description, the same is to be considered as illustrative and not restrictive in character, it being understood that only three embodiments have been shown and described and that all changes and modifications that come within the spirit of the invention are desired to be protected.

What is claimed is:

1. An attachment for facilitating turning of a rotary tiller having an engine, an axle with two wheels, a set of tines, and handlebars, said attachment comprising:
   a plate having sufficient strength to support the weight of the rotary tiller when said plate is resting on the ground, said plate having a perpendicular axis about which said plate is substantially symmetric;
   means for attaching said plate to the rotary tiller with said perpendicular axis of said plate proximately aligned with the center of gravity of the rotary tiller and so that said plate is disengaged from the ground when the tiller is in normal operation and said plate contacts the ground when the tiller is pivoted about the tiller's axle onto said plate to a turning position, whereby the tiller can be turned by rotating the tiller while said tiller is supported by said plate.

2. The rotary tiller attachment of claim 1, wherein said plate is octagonally shaped.

3. The rotary tiller attachment of claim 1, wherein said plate is generally convex and has a smooth outer ground contacting surface.

4. An attachment for facilitating turning of a rotary tiller having an engine, an axle with two wheels, a set of tines, and handlebars, said attachment comprising:
   a plate having sufficient strength to support the weight of the rotary tiller when said plate is resting on the ground;
   means for attaching said plate to the rotary tiller so that said plate is disengaged from the ground when the tiller is in normal operation and said plate contacts the ground when the tiller is pivoted about the tiller's axle onto said plate to a turning position, whereby the tiller can be turned by rotating the tiller while said tiller is supported by said plate, wherein
   said plate includes a shaft attached thereto, said shaft defining an axis of rotation; and
   said means for attaching includes means for connecting said shaft to the tiller so that said axis of rotation is proximately aligned with the center of gravity of the rotary tiller.

5. The rotary tiller attachment of claim 2, wherein said means for attaching includes means for permitting said plate to rotate with respect to the tiller.

6. The rotary tiller attachment of claim 4, wherein said means for attaching comprises:
   a collar which receives and supports said shaft;
   a support member having two ends, one end attached to said collar and the other end provided with a means for removably attaching said support member to the tiller;
   a tube defining an internal diameter and attached to said collar perpendicular to said axis of rotation;
   a rod which is threaded at both ends, which is slightly longer than said tube, and which is of a diameter smaller than said internal diameter of said tube, said rod being received through said tube so that said threaded ends of said rod protrude from each respective end of said tube; and
   two struts, each having a first end and a second end, said first end of each said strut defining a bore therethrough which is rotatably secured to one said threaded end of said rod, said second end of each said strut provided with a means for removably attaching said strut to the tiller.

7. The rotary tiller attachment of claim 6, wherein said means for attaching further comprises a brace having a first end and a second end, said first end is removably connectable to said collar opposite said support member, said second end is removably connectable to the tiller.

8. The rotary tiller attachment of claim 6, wherein said means for attaching further comprises a means for preventing said plate from rotating with respect to said collar.

9. The rotary tiller attachment of claim 8, wherein said means for attaching includes means for orienting said plate in said turning position so that the tiller is supported by said plate and one wheel of the tiller when rotating the tiller to change direction.

10. The rotary tiller attachment of claim 4, wherein said plate is octagonally shaped.

11. The rotary tiller attachment of claim 4, wherein said plate is generally convex and has a smooth outer ground contacting surface.

* * * * *